US011657293B2

(12) United States Patent
Hasan et al.

(10) Patent No.: US 11,657,293 B2
(45) Date of Patent: May 23, 2023

(54) ASYNCHRONOUS ARCHITECTURE FOR EVOLUTIONARY COMPUTATION TECHNIQUES

(71) Applicant: X Development LLC, Mountain View, CA (US)

(72) Inventors: Sahil Hasan, Mountain View, CA (US); Jeffrey Bush, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 840 days.

(21) Appl. No.: 16/676,977

(22) Filed: Nov. 7, 2019

(65) Prior Publication Data

US 2021/0142183 A1   May 13, 2021

(51) Int. Cl.
*G06N 20/00* (2019.01)
*G06F 30/33* (2020.01)
*G06N 3/126* (2023.01)
*G06F 30/327* (2020.01)

(52) U.S. Cl.
CPC .......... *G06N 3/126* (2013.01); *G06F 30/327* (2020.01)

(58) Field of Classification Search
CPC ...... G06N 3/126; G06N 20/00; G06F 30/327; G06F 30/20; G06F 2111/02; G06F 2111/06
See application file for complete search history.

(56) References Cited

U.S. PATENT DOCUMENTS

| | | | | |
|---|---|---|---|---|
| 9,466,023 | B1 * | 10/2016 | Shahrzad | G06Q 10/0633 |
| 2009/0150711 | A1 * | 6/2009 | Kami | G06F 11/008 |
| | | | | 714/1 |
| 2013/0066869 | A1 * | 3/2013 | Kusaka | G06F 11/0715 |
| | | | | 707/E17.046 |

(Continued)

OTHER PUBLICATIONS

Ammi, M., and S. Chikhi, "A Generalized Island Model Based on Parallel and Cooperating Metaheuristics for Effective Large Capacitated Vehicle Routing Problem Solving," Journal of Computing and Information Technology 23(2):141-155, 2015.

(Continued)

*Primary Examiner* — Brandon S Cole
(74) *Attorney, Agent, or Firm* — Christensen O'Connor Johnson Kindness PLLC

(57) ABSTRACT

In some embodiments, an archipelago model is provided for distributed execution of evolutionary computing techniques. In some embodiments, an archipelago manager computing device manages a centralized archipelago management queue, and provides population subsets to a plurality of island computing devices. The archipelago manager computing device receives candidate solutions from the island computing devices, stores the candidate solutions in the archipelago management queue, and transmits candidate solutions from the archipelago management queue to the island computing devices in order to exchange candidate solutions between the island computing devices. The use of an archipelago management queue allows transfer of candidate solutions between different island computing devices, is robust to failure of any given island computing device, and does not require homogeneity within the plurality of island computing devices.

12 Claims, 12 Drawing Sheets

(56) References Cited

U.S. PATENT DOCUMENTS

2015/0178642 A1* 6/2015 Abboud ................ G06Q 10/02
705/5

OTHER PUBLICATIONS

Cannovó, F., et al., "Variational Method for Image Denoising by Distributed Genetic Algorithms on GRID Environment," Proceedings in the 15th IEEE International Workshops on Enabling Technologies: Infrastructure for Collaborative Enterprises (WETICE '06), Jun. 26-28, 2006, Manchester, UK, 7 pages.

* cited by examiner

ASYNCHRONOUS ARCHITECTURE FOR EVOLUTIONARY COMPUTATION TECHNIQUES

TECHNICAL FIELD

This disclosure relates generally to distributed computing, and in particular but not exclusively, relates to distributed processing of evolutionary computation techniques.

BACKGROUND

FIG. 1 is a schematic illustration of a non-limiting example embodiment of a genetic computation technique. A population of individuals is initialized in a first step. In the present disclosure, the terms "individual," "candidate solution," "organism," and "genetic material" may be used interchangeably to refer to the members of the population that are processed using evolutionary computation techniques. In some embodiments, each individual may be represented by a code object that includes a vector that represents various traits, though the specific representation of the individuals should not be seen as limiting.

A certain number of individuals are removed from the population in a second step. Typically, a fitness value is calculated for each individual in the population, and the individuals with lower fitness values are the individuals removed from the population. A new generation of individuals is created in a third step by combining traits from the remaining individuals in the population. This step, also referred to as "procreation," may involve splicing together the representations of pairs of individuals around a random point in the vector representations. Some of the individuals in the population are mutated in a random way in a fourth step. In this step, random elements in the vector representations may be changed.

The technique then returns to the second step to test the fitness of each individual in the population. The technique loops over these steps as illustrated, and the fitness of the individuals in the population is increased by virtue of the trait combination and mutation. The loop may execute for a predetermined number of generations, may execute until at least a minimum fitness value is achieved, or may execute until the fitness of the population stabilizes. Another way of looking at such evolutionary computation techniques is to describe them as techniques for searching a universe of possible individuals (or solutions to a problem) for the fittest individuals (or best solutions to the problem).

SUMMARY

In some embodiments, a non-transitory computer-readable medium is provided. The computer-readable medium has computer-executable instructions stored thereon that, in response to execution by one or more processors of a computing device, cause the computing device to perform actions for optimizing calculation of an evolutionary computation technique, the actions comprising: receiving a first set of candidate solutions from a first island computing device; storing the first set of candidate solutions in an archipelago management queue; removing a second set of candidate solutions from the archipelago management queue; and transmitting the second set of candidate solutions to the first island computing device.

In some embodiments, a system is provided. The system comprises a plurality of island computing devices including a first island computing device, and an archipelago manager computing device. The archipelago manager computing device includes at least one processor and a non-transitory computer-readable medium having logic stored thereon. The logic, in response to execution by the at least one processor, cause the archipelago manager computing device to perform actions comprising: receiving a first set of candidate solutions from the first island computing device; storing the first set of candidate solutions in an archipelago management queue; removing a second set of candidate solutions from the archipelago management queue; and transmitting the second set of candidate solutions to the first island computing device.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

The calculation of each generation in an evolutionary computation technique can be very resource intensive, particularly when the universe of possible individuals and/or the size of the populations are large. Multiple approaches for increasing the speed of these calculations exist, and distributed versions of the techniques vary. Distributed and parallel GAs typically follow a relatively straight-forward policy, such as having every core per CPU per machine run a separate population of genetic algorithms and then keep sending the best organisms one layer up (i.e. the CPU takes the best organisms across its cores, the machine selects the best organisms across CPUs, and then the best organism is selected from the pool of machines).

Evolutionary algorithms in general tend to have two flaws. The first is that they may converge to local optima rather than the global optimum of the function they are trying to optimize. The second is that they do not perform well for optimization of large organisms. That is to say, while they may solve NP-hard problems with some success, if left to grow unfettered, evolutionary algorithms tend to perform poorly.

One technique used to address some of these flaws is the island model. The idea is to have separate "islands" of genetic material that occasionally have individuals migrate between them. This tries to avoid premature convergence and allow for globally shared information. This also allows work to be shared between distributed machines and thereby speed up solution finding. The island model in general usually requires some island migration structure. Often this is a ring of islands, where each island has a single designated island it sends genetic material to. For this mechanism to work, two things need to remain true: islands must synchronize migration intervals (so that each island continues to have the same amount of genetic material), and all islands must remain running until the entire system converges. These provide restrictions in functionality and requirements of environmental stability. For example, it is important in such techniques that each of the devices that is executing one or more islands provides a matching amount of computing resources to avoid the island processing becoming unbalanced. As another example, if any one computing device executing an island suffers a failure, the entire calculation will fail.

What is desired are techniques for distributing evolutionary computation techniques amongst multiple computing devices without requiring that the multiple computing devices match each other with respect to processing capabilities, and while remaining robust to failure of any given computing device.

Figure 2:
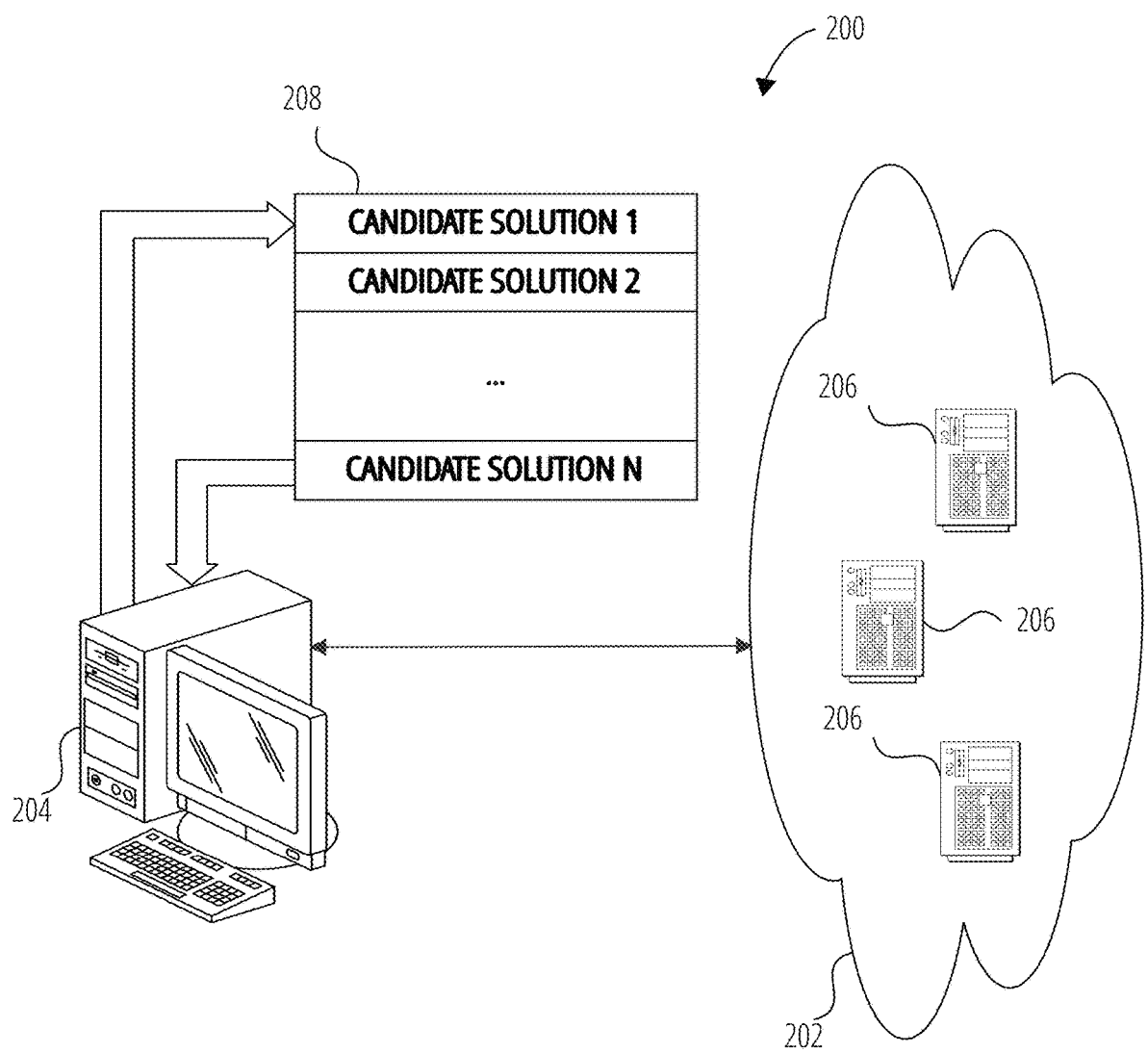
FIG. 2 is a schematic illustration of a non-limiting example embodiment of a system according to various aspects of the present disclosure.

In some embodiments of the present disclosure, techniques are provided that remove the requirement for any specific island connection structure, and provide robustness with respect to differences in computing power for island computing devices and potential failures of individual island computing devices. FIG. 2 is a schematic illustration of a non-limiting example embodiment of a system 200 according to various aspects of the present disclosure. The system 200 provides a set of island computing devices 206 arranged into what is referred to as an "archipelago." The island computing devices 206 are connected via a network 202 to an archipelago manager computing device 204. The network 202 may any suitable type of communication technology, including but not limited to wireless technologies (including but not limited to 2G, 3G, 4G, 5G, LTE, Wi-Fi, WiMAX, and Bluetooth), wired technologies (including but not limited to Ethernet, USB, and FireWire), and/or combinations thereof.

The archipelago manager computing device 204 provides a centralized queue, the archipelago management queue 208, that is used to handle all migration of candidate solutions, individuals, or other "genetic information" from one island computing device 206 to another island computing device 206. The archipelago manager computing device 204 receives messages of genetic information for island computing devices 206 and acts as a centralized queue for all messages. An island computing device 206 sending genetic material to the archipelago management queue 208 will pull a matching amount of new genetic material from the archipelago management queue 208.

This allows for highly modular and asynchronous evolutionary systems that allow for a myriad of extensions to traditional island infrastructure. For example, each island computing device is no longer reliant on there being a set order of migration. This allows for failures of particular island computing devices without causing issues to the overall system, because the non-failed island computing devices may simply obtain new individuals from the archipelago management queue 208 from island computing devices other than the failed island computing devices. This also allows for a "fire ecology" model, where if an island computing device performs well and generates a candidate solution that is viewed as a global optimum, one can keep the population of that island computing device and restart the populations of one or more other island computing devices. This further allows one to ensure that a true global optimum is reached, and in the cases of incredibly large search spaces prevents restriction into a singular search space.

A super-archipelago model is also an important dynamic that provides additional utility. As genetic algorithms fall apart when allowed to have unfettered growth, the super-archipelago model divides a large problem into many sub-problems, similar to concepts in dynamic programming. Then, different archipelagos are created and assigned various subproblems, which are then combined and undergo a reduction and optimization step of a single archipelago at the end. This final step may be limited in size to the linear combination of all the outputs of the sub-problem optimal solutions, and focuses purely on maintaining effectiveness (within some tolerance) while reducing size.

Furthermore, a feedback loop can be generated for population generation, where as archipelagos explore previously unexplored global space, they are able to store objects that are representative of that space. Thus archipelagos can be initialized in a frontier exploration mode, where populations are defined purely by the frontier of explored space. This allows for dynamic population initialization of designated search spaces to encourage growth in a certain direction.

The techniques disclosed herein are useful for solving many types of problems using evolutionary calculation techniques, including problems that have extremely large search spaces and have many inputs. One non-limiting example of a task that can be computed with an archipelago system is circuit design. Some other non-limiting examples of problems that could be solved with an archipelago system include communication network topology determinations, supply strategies, scheduling, and generative design.

Figure 3:
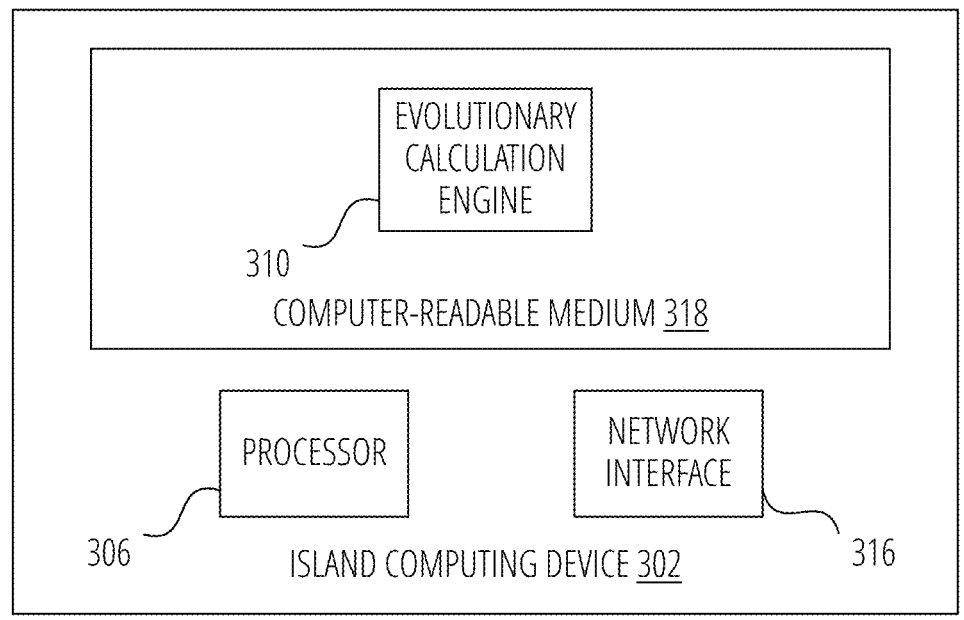
FIG. 3 is a block diagram that illustrates non-limiting example embodiments of an island computing device and an archipelago manager computing device according to various aspects of the present disclosure.
Figure 3:
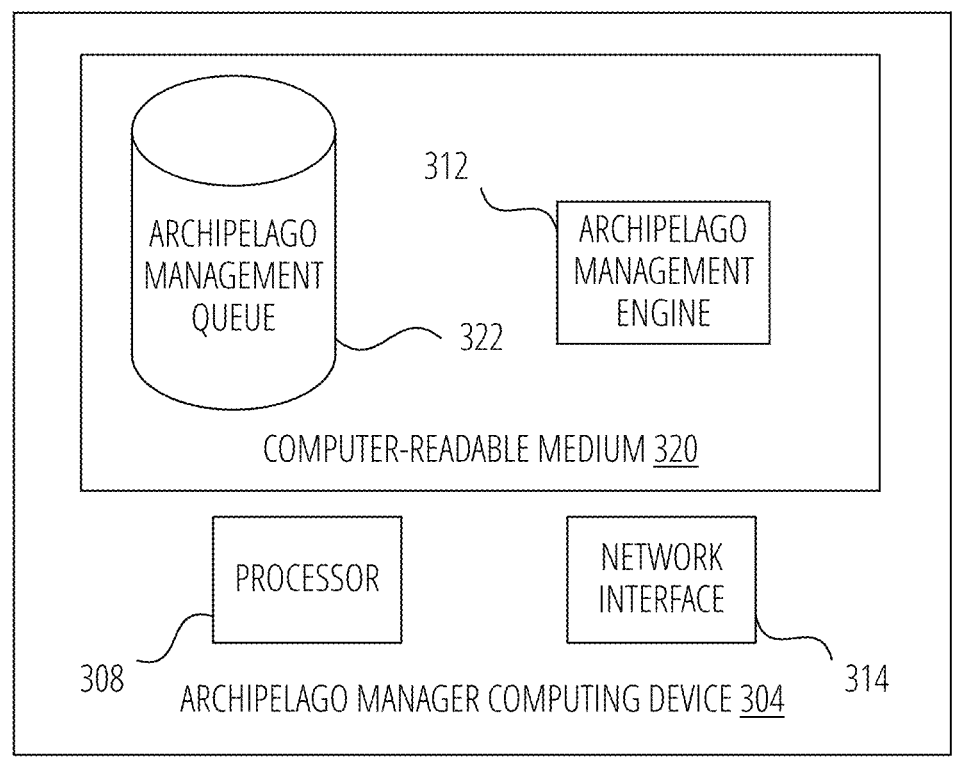

FIG. 3 is a block diagram that illustrates non-limiting example embodiments of an island computing device 302 and an archipelago manager computing device 304 according to various aspects of the present disclosure.

The island computing device 302 may be any suitable type of computing device for executing an evolutionary computation technique. In some embodiments, the island computing device 302 may be a rack-mount server computing device, a desktop computing device, a laptop computing device, a mobile computing device, or any other type of computing device. In some embodiments, the functionality of an island computing device 302 may be provided by a virtual machine running on a physical computing device. In some embodiments, the functionality of an island computing device 302 may be provided by hardware components of a cloud computing system. In some embodiments, multiple island computing devices may be used, in which case different types of computing devices may be concurrently used as island computing devices.

As shown, the island computing device 302 includes at least one processor 306, a network interface 316, and a computer-readable medium 318. In some embodiments, an island computing device 302 may have more than one processor 306, and/or may include a processor 306 that itself includes more than one processing core. In some embodiments, the network interface 316 may be a type of interface that is suitable for communicating with the network 202 described above. In some embodiments, the computer-readable medium 318 may be any type of suitable computer-readable medium.

"Computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

As shown, the computer-readable medium 318 includes an evolutionary calculation engine 310. In some embodiments, the evolutionary calculation engine 310 is configured to receive population subsets and to perform an evolutionary computation technique to improve the fitness of the individuals in the population subsets. The evolutionary calculation engine 310 is also configured to exchange genetic material, individuals, or candidate solutions with other island computing devices via the archipelago management queue 322.

The archipelago manager computing device 304 may be any suitable type of computing device for managing distribution of population subsets to a plurality of island computing devices, and for managing communication between the plurality of island computing devices. In some embodiments, the archipelago manager computing device 304 may be a rack-mount server computing device, a desktop computing device, a laptop computing device, a mobile computing device, or any other type of computing device. In some embodiments, the functionality of the archipelago manager computing device 304 may be provided by a virtual machine running on a physical computing device, or by hardware components of a cloud computing system.

As shown, the archipelago manager computing device 304 includes at least one processor 308, a network interface 314, and a computer-readable medium 320. The network interface 314 may be selected to interface with the network 202, and the computer-readable medium 320 may be any type of suitable computer-readable medium.

As shown, the computer-readable medium 320 includes an archipelago management queue 322 and an archipelago management engine 312. In some embodiments, the archipelago management engine 312 is configured to generate populations, divide the populations into population subsets, and provide the population subsets to island computing devices for processing. The archipelago management engine 312 is also configured to manage transfer of individuals, genetic material, or candidate solutions between island computing devices via the archipelago management queue 322. In some embodiments, the archipelago management queue 322 is stored by the archipelago manager computing device 304 on a computer-readable medium 320 of the archipelago manager computing device 304, as illustrated. In some embodiments, the archipelago management queue 322 may be stored in a network-accessible storage medium, including but not limited to a network-accessible disk drive, a network-accessible database management system, or a cloud storage system.

"Engine" refers to logic embodied in hardware or software instructions, which can be written in a programming language, such as C, C++, COBOL, JAVA™ PHP, Perl, HTML, CSS, JavaScript, VBScript, ASPX, Microsoft .NET™, Go, Python, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be stored in any type of computer-readable medium or computer storage device and be stored on and executed by one or more general purpose computers, thus creating a special purpose computer configured to provide the engine or the functionality thereof.

Figure 4:
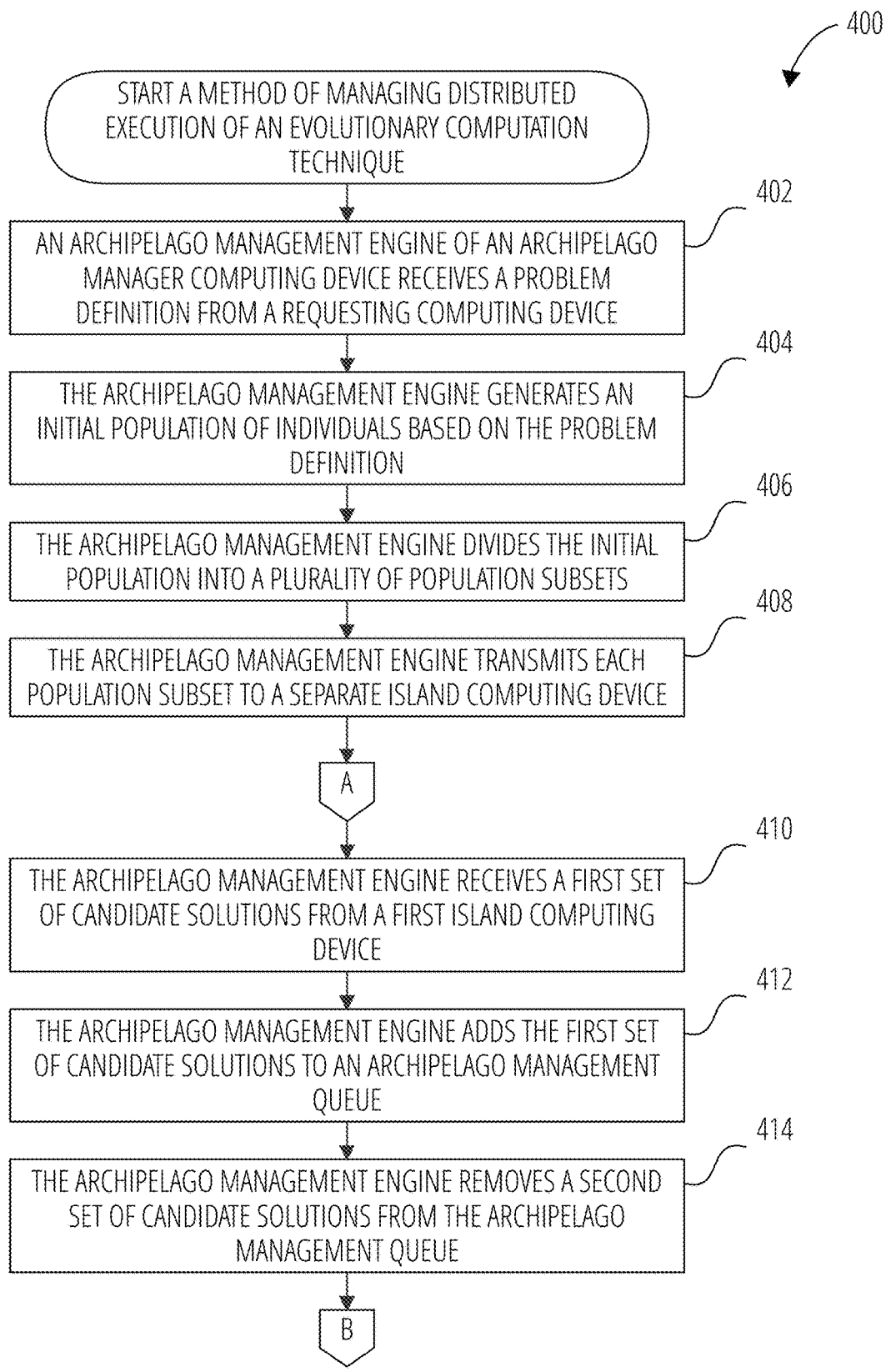
FIG. 4-FIG. 6 are a flowchart that illustrates a non-limiting example embodiment of a method of managing distributed execution of an evolutionary computation technique according to various aspects of the present disclosure.
Figure 5:
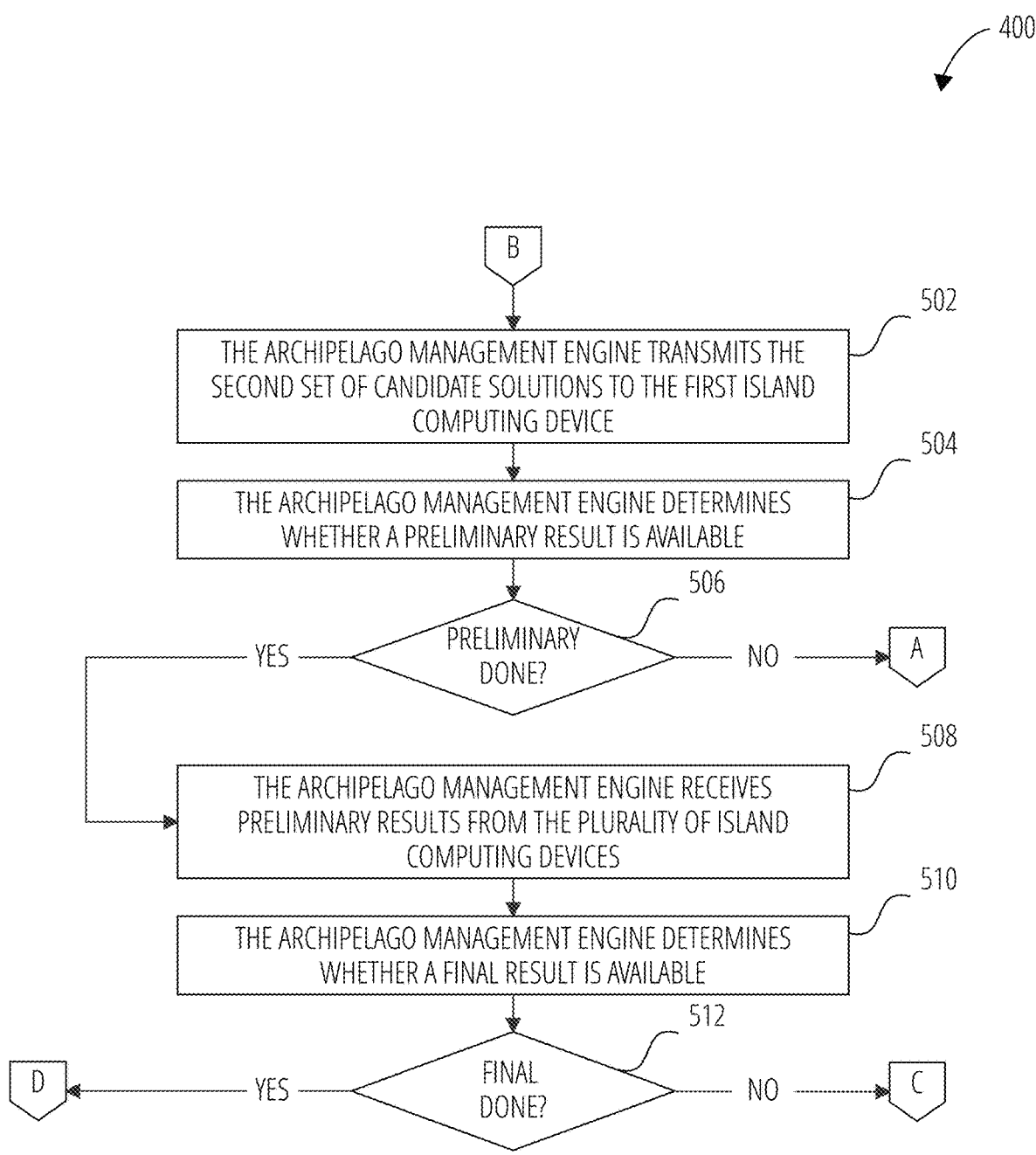
Figure 6:
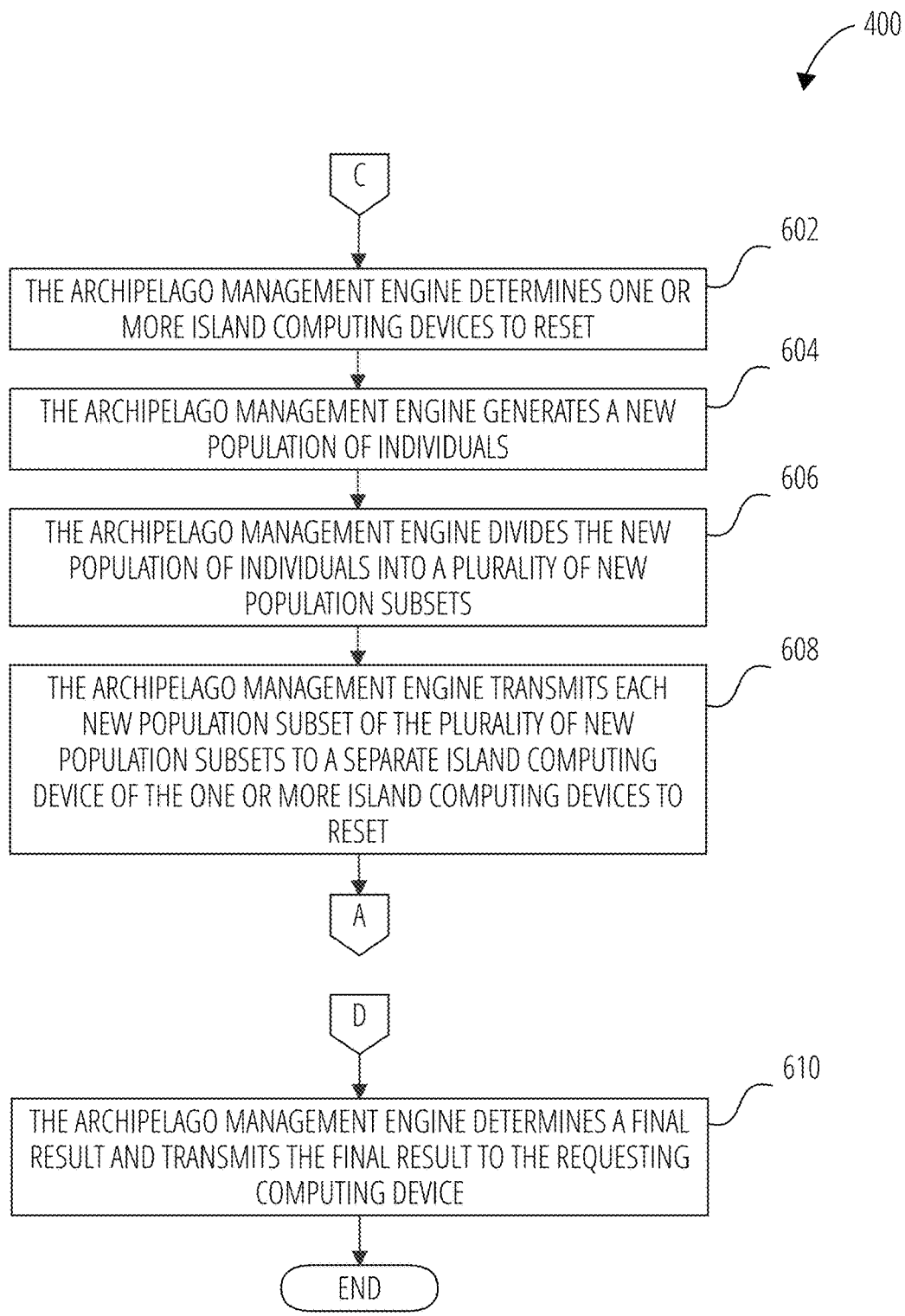

FIG. 4-FIG. 6 are a flowchart that illustrates a non-limiting example embodiment of a method of managing distributed execution of an evolutionary computation technique according to various aspects of the present disclosure. In the method 400, a problem (including but not limited to generation of a circuit design) is processed using a plurality of island computing devices managed by an archipelago manager computing device. Compared to traditional methods for managing an evolutionary computation technique, the method 400 is improved, at least because the method 400 is robust to failure of one or more of the plurality of island computing devices and does not require homogeneity within the plurality of island computing devices.

From a start block, the method 400 proceeds to block 402, where an archipelago management engine 312 of an archipelago manager computing device 304 receives a problem definition from a requesting computing device. In some embodiments, the problem definition may include parameters that describe a potential design space to be searched using the evolutionary computation technique. In some embodiments, the problem definition may include a fitness function for determining whether a given individual is better or worse than other individuals.

At block 404, the archipelago management engine 312 generates an initial population of individuals based on the problem definition. In some embodiments, the archipelago management engine 312 may generate characteristics of the individuals the initial population such that the individuals are widely distributed within the potential design space, in order to provide a high degree of coverage of the potential design space. In some embodiments, the characteristics of the individuals of the initial population may be generated randomly.

At block 406, the archipelago management engine 312 divides the initial population into a plurality of population subsets. In some embodiments, the archipelago management engine 312 may create a number of population subsets that matches an available number of island computing devices. In some embodiments, each population subset may include an equal number of individuals. In some embodiments, each population subset may be sized differently based on one or more capabilities of the island computing device to which the population subset will be assigned. For example, if a first island computing device has a greater memory capacity or a greater processing power (by virtue of, for example, having a larger number of processing cores) than a second island computing device, then the population subset assigned to the first island computing device may include more individuals than the population subset assigned to the second island computing device.

At block 408, the archipelago management engine 312 transmits each population subset to a separate island computing device. The population subsets are transmitted via the network 202. In some embodiments, the archipelago management engine 312 may store a record of the contents of each population subset. This record may later be used by the archipelago management engine 312 to avoid re-processing portions of the search space that have already been processed. In some embodiments, some individuals of the initial population may be retained by the archipelago management engine 312, and may be added to the archipelago management queue 322 in order to initialize the archipelago management queue 322.

The method 400 then proceeds through a continuation terminal ("terminal A") to block 410, where the archipelago management engine 312 receives a first set of candidate solutions from a first island computing device. The first set of candidate solutions (or individuals) may be computed by the first island computing device using any suitable technique, including but not limited to the method 1100 described in further detail below. The solutions or individuals are "candidate solutions" in that they are proposed by the first island computing device as having the highest fitness values out of the individuals currently considered by the first island computing device.

At block 412, the archipelago management engine 312 adds the first set of candidate solutions to an archipelago management queue 322. At block 414, the archipelago management engine 312 removes a second set of candidate solutions from the archipelago management queue 322. The method 400 then proceeds to a continuation terminal ("terminal B"). From terminal B (FIG. 5), the method 400 proceeds to block 502, where the archipelago management engine 312 transmits the second set of candidate solutions to the first island computing device. By transmitting the first set of candidate solutions to the archipelago management engine 312 and receiving the second set of candidate solutions from the archipelago management engine 312, the first island computing device has performed a transfer of individuals with some other island computing device (or island computing devices) within the archipelago. In some embodiments, the size of the second set of candidate solutions is determined based on the size of the first set of candidate solutions so that the size of the population subset processed by the first island computing device remains consistent.

Figure 7:
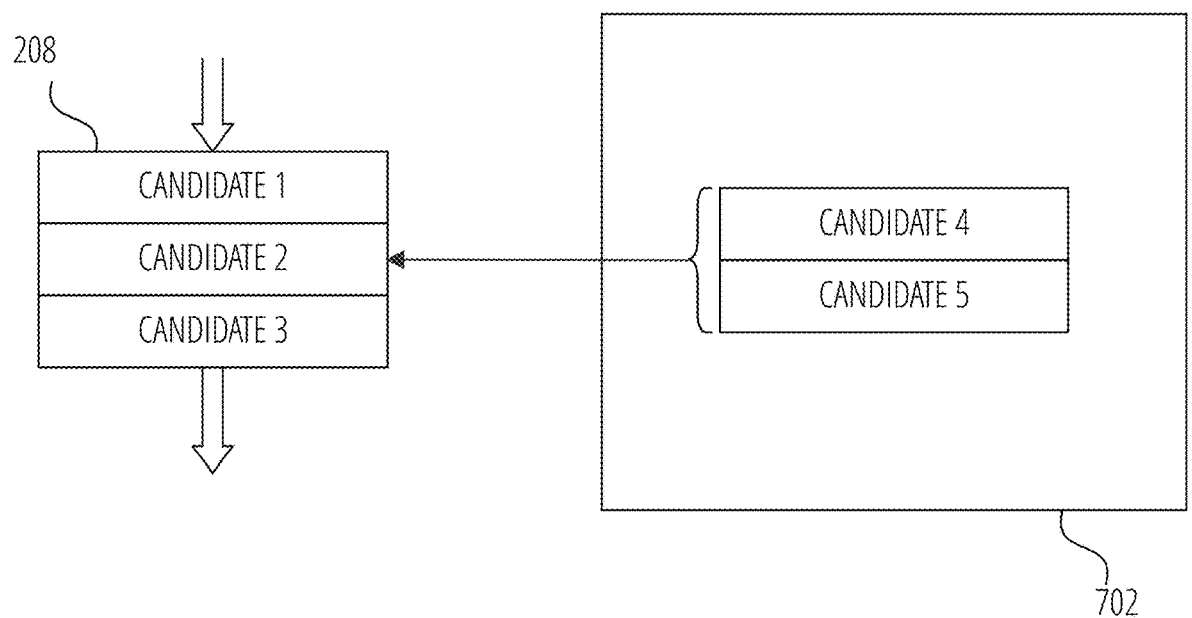
FIG. 7-FIG. 10 are schematic drawings that illustrate non-limiting example embodiments of addition and removal of candidate solutions from an archipelago management queue according to various aspects of the present disclosure.
Figure 8:
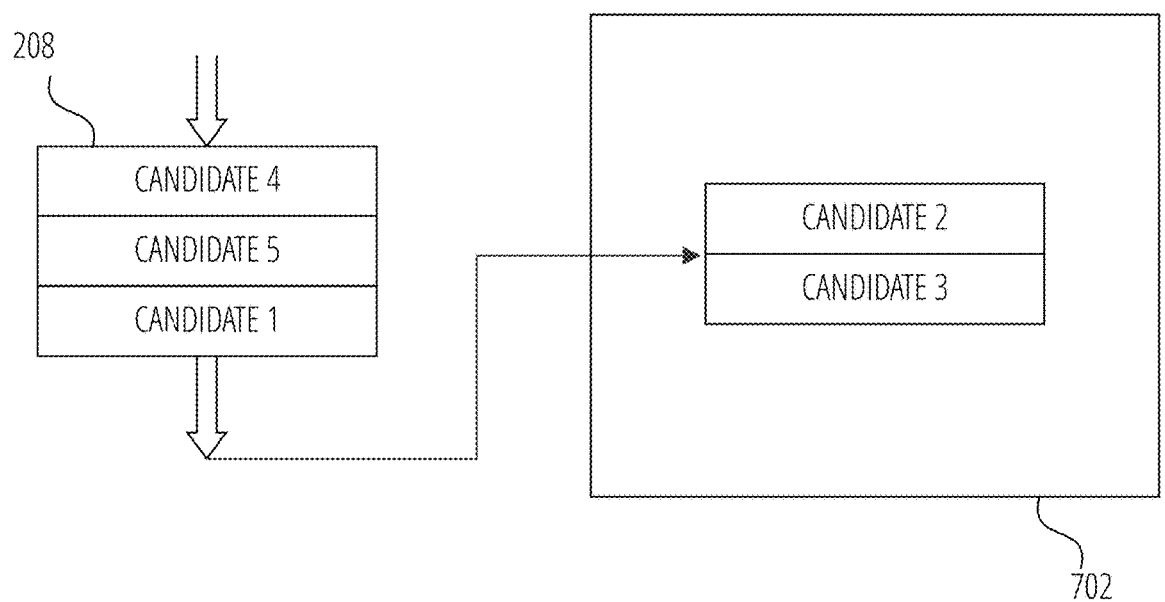

FIG. 7-FIG. 8 are schematic illustrations that show a non-limiting example embodiment of the transfer of candidate solutions from and to a first island computing device according to various aspects of the present disclosure. In the illustrated schematic, the first island computing device 702 has generated a first set of candidate solutions that includes candidate 4 and candidate 5. The first island computing device 702 may also include further candidate solutions, but candidate 4 and candidate 5 may be selected as the candidate solutions to be transferred to another island computing device. In some embodiments, candidate 4 and candidate 5 may have been the candidate solutions with the highest fitness value. In some embodiments, candidate 4 and candidate 5 may have been chosen randomly from within the population subset after a predetermined number of generations had been processed.

As shown in FIG. 7, the first set of candidate solutions is transmitted to the archipelago management queue 208. FIG. 8 shows the result of the transfer: candidate 4 and candidate 5 have been inserted to the top of the archipelago management queue 208, and the two elements at the bottom of the archipelago management queue 208—candidate 2 and candidate 3—have been removed from the archipelago management queue 208 and transmitted to the first island computing device 702. Because the first island computing device 702 transmits and receives the candidate solutions to and from the archipelago management queue 208, the source of the candidate solutions (e.g., the specific island computing device that generated candidate 2 and candidate 3) is irrelevant. Accordingly, the first island computing device 702 is not reliant on successful processing being conducted by any specific other island computing device.

Figure 9:
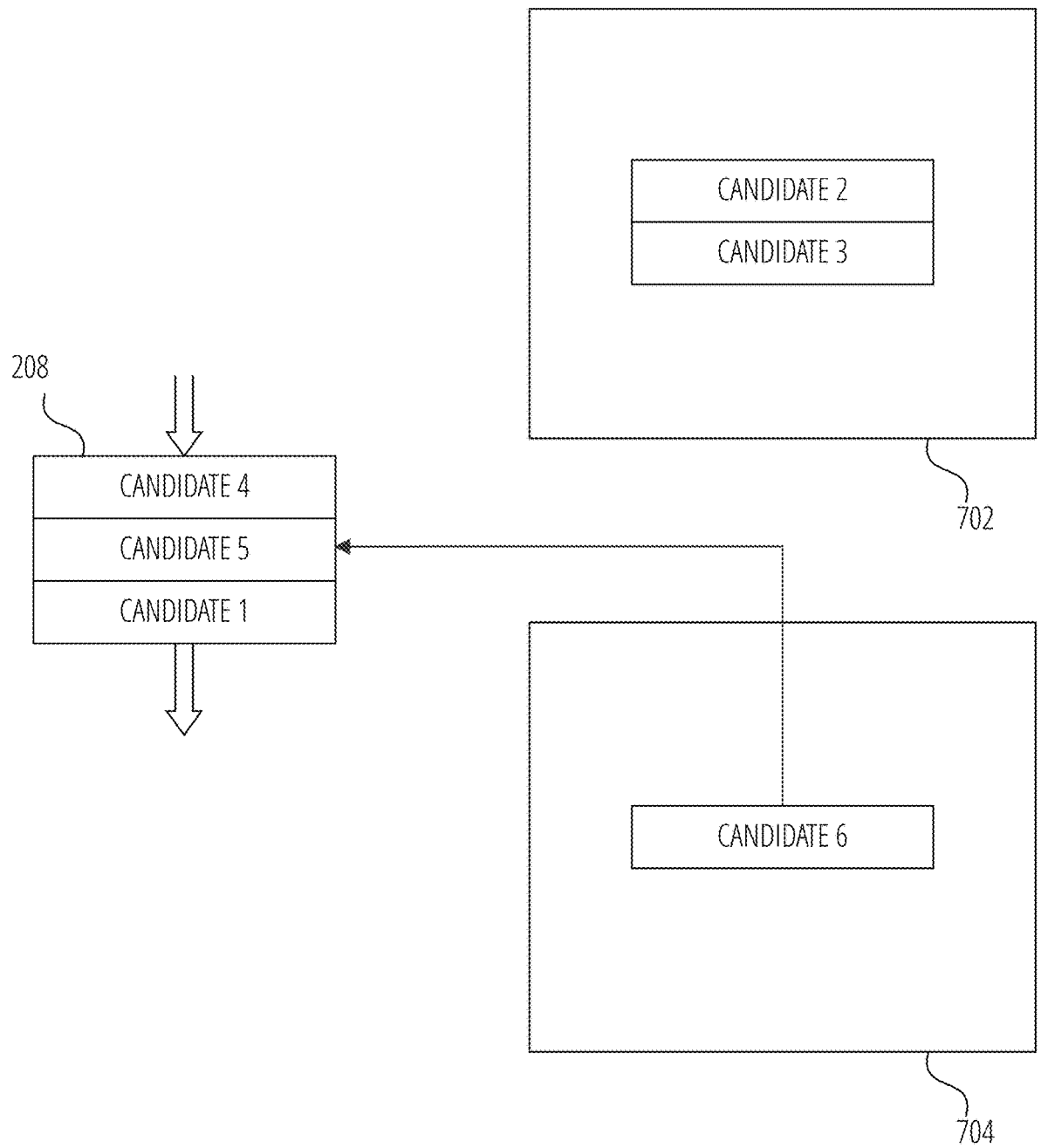
Figure 10:
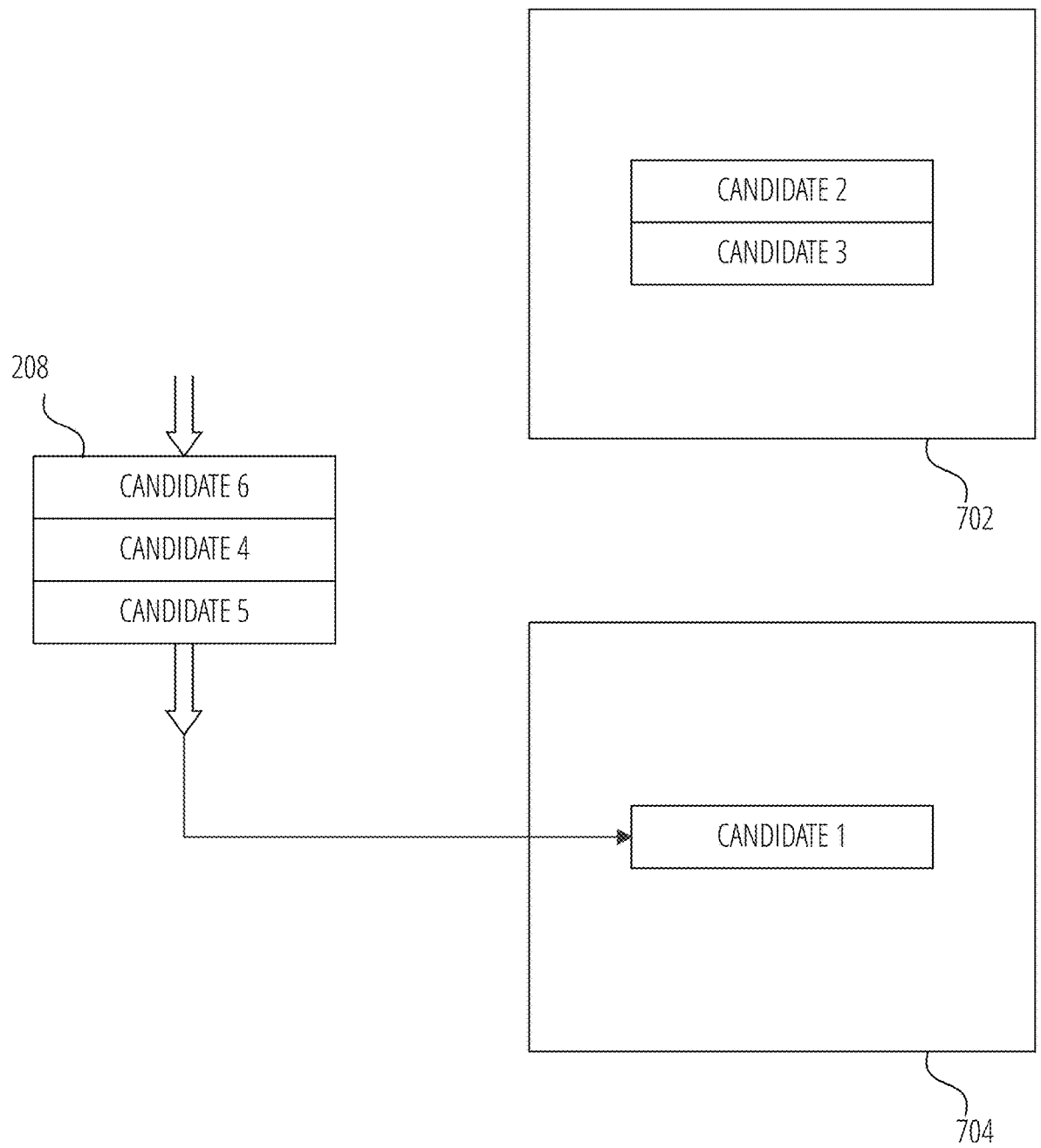

Further, because the size of the second set of candidate solutions is determined based on the size of the first set of candidate solutions, there is no requirement that every island computing device adds or removes the same number of candidate solutions from the archipelago management queue 208 at once. FIG. 9-FIG. 10 are schematic illustrations that show a non-limiting example embodiment of the transfer of candidate solutions from and to a second island computing device according to various aspects of the present disclosure. The second island computing device 704, as illustrated, has less computing power than the first island computing device 702. Hence, the second island computing device 704 processes a smaller population subset, and exchanges a smaller number of candidate solutions with the archipelago management queue 208. As shown in FIG. 9, the second island computing device 704 transfers a single candidate solution—candidate 6—to the archipelago management queue 208. FIG. 10 shows that candidate 6 has been added to the top of the archipelago management queue 208, and the bottom candidate (candidate 1) has been removed from the archipelago management queue 208 and transmitted to the second island computing device 704. The archipelago management queue 208 now includes candidate solutions from both the first island computing device 702 and the second island computing device 704, which may then be transmitted to any island computing devices in the plurality of island computing devices.

Returning to FIG. 5, at block 504, the archipelago management engine 312 determines whether a preliminary result is available, and at decision block 506, a decision is made based on the determination of whether the preliminary result is available. The determination of availability of a preliminary result may be performed in any suitable manner. For example, the archipelago management engine 312 may determine whether the fitness of the candidate solutions on the island computing devices has stabilized or otherwise reached a maximum value. As another example, the archipelago management engine 312 may determine whether a predetermined number of iterations of transfer of candidate solutions between island computing devices have occurred. As yet another example, the archipelago management engine 312 may determine whether a fitness threshold has been reached.

If the archipelago management engine 312 determines that a preliminary result is not yet available, then the method 400 returns to terminal A to process more generations and transmit more candidate solutions between island computing devices. Otherwise, if the archipelago management engine 312 determines that a preliminary result is available, then the method 400 proceeds to block 508, where the archipelago management engine 312 receives preliminary results from the plurality of island computing devices. In some embodiments, the preliminary results may represent the fittest candidate solutions from each of the island computing devices. In some embodiments, the preliminary results may include the entire population subsets currently residing on each island computing device.

At block 510, the archipelago management engine 312 determines whether a final result is available, and at decision block 512, a decision is made based on the determination of whether the final result is available. Again, any suitable technique for determining whether a final result is available, such as checking whether a predetermined number of iterations have been completed, whether fitness of the candidate solutions has stabilized, or whether a fitness threshold has been satisfied, may be used. If the archipelago management engine 312 determines that a final result is available, the method 400 proceeds to a continuation terminal ("terminal D"). Otherwise, if the archipelago management engine 312 determines that a final result is not yet available, the method 400 proceeds to another continuation terminal ("terminal C").

At terminal C (FIG. 6), the archipelago management engine 312 has determined that a final result is not yet available. Accordingly, at block 602, the archipelago management engine 312 determines one or more island computing devices to reset. The reset of one or more island computing devices is also referred to as a "fire ecology" model, wherein the high-performing populations of one or more island computing devices are retained, and the populations on the remaining one or more island computing devices are deleted in order to use those island computing devices to search new areas of the problem space. This fire ecology model can help avoid ending up in a sub-optimal local maximum of the fitness function. In some embodiments, the archipelago management engine 312 may choose a predetermined number of the island computing devices having the highest-performing populations to retain, and may determine that the remainder of the island computing devices should be reset.

At block 604, the archipelago management engine 312 generates a new population of individuals. In some embodiments, the archipelago management engine 312 may use stored information regarding the population subsets of the initial population that were provided to the reset island computing devices, and may generate the new population of individuals to avoid the previously processed population subsets.

At block 606, the archipelago management engine 312 divides the new population of individuals into a plurality of new population subsets. At block 608, the archipelago management engine 312 transmits each new population subset of the plurality of new population subsets to a separate island computing device of the one or more island computing devices to reset. As in block 406 and block 408, the archipelago management engine 312 may determine the number of new population subsets based on the number of reset island computing devices, and may size each new population subset based on the relative computing power of each of the reset island computing devices. The method 400 then returns to terminal A, where the island computing devices—including the retained island computing devices and the reset island computing devices—process the newly assigned population subsets.

At terminal D, the archipelago management engine 312 has determined that a final result is available. Accordingly, at block 610, the archipelago management engine 312 determines a final result and transmits the final result to the requesting computing device. The final result may be determined based on finding one or more candidate solutions that have the highest fitness value.

The method 400 then proceeds to an end block and terminates.

Figure 11:
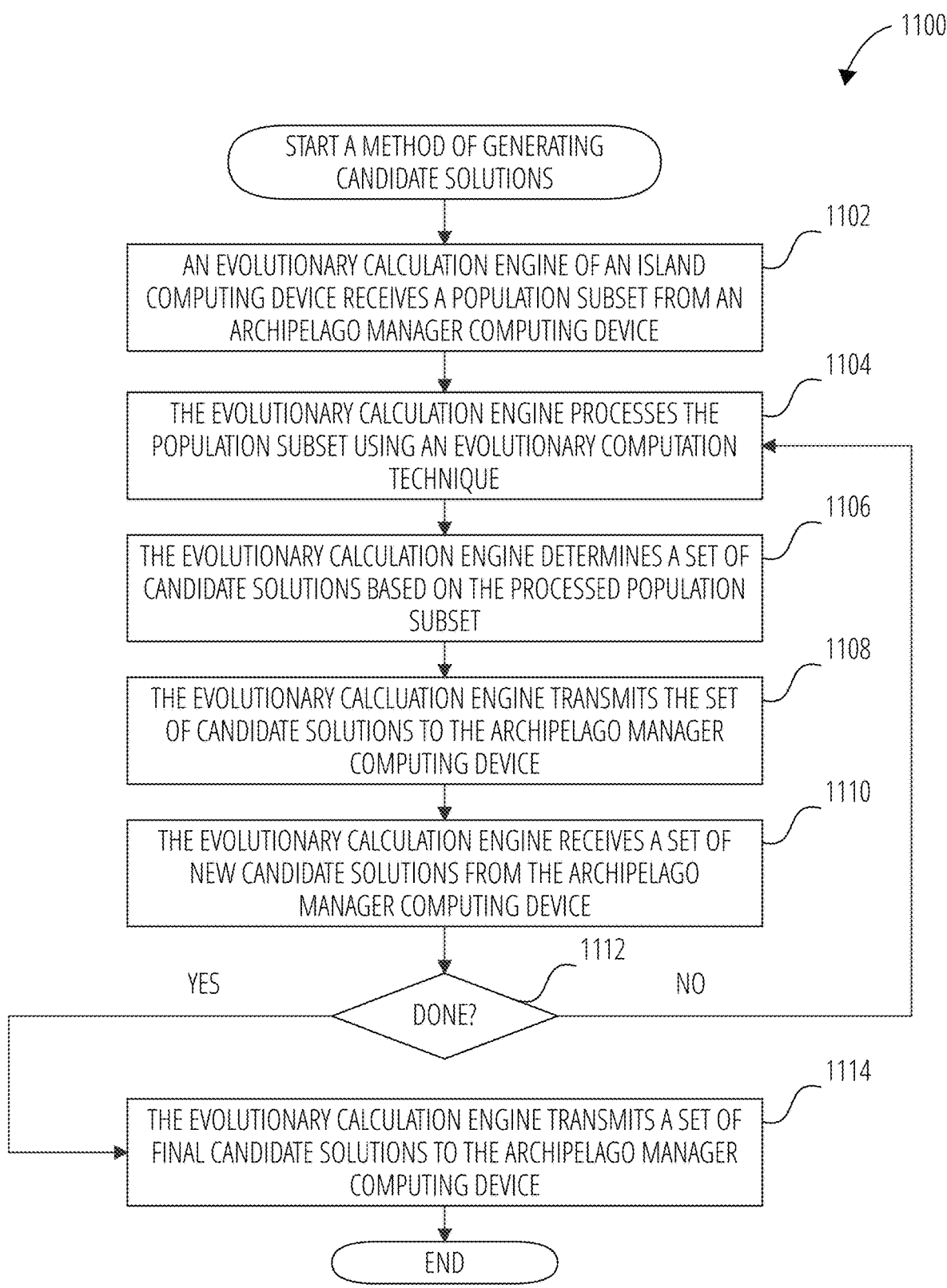
FIG. 11 is a flowchart that illustrates a non-limiting example embodiment of a method of generating candidate solutions according to various aspects of the present disclosure.

FIG. 11 is a flowchart that illustrates a non-limiting example embodiment of a method of generating candidate solutions according to various aspects of the present disclosure. The method 1100 may be used by an island computing device 302 in order to process a population subset assigned to the island computing device 302 by the archipelago manager computing device 304.

From a start block, the method 1100 proceeds to block 1102, where an evolutionary calculation engine 310 of an island computing device 302 receives a population subset from an archipelago manager computing device 304. The population subset may be received via the network 202.

Figure 1:
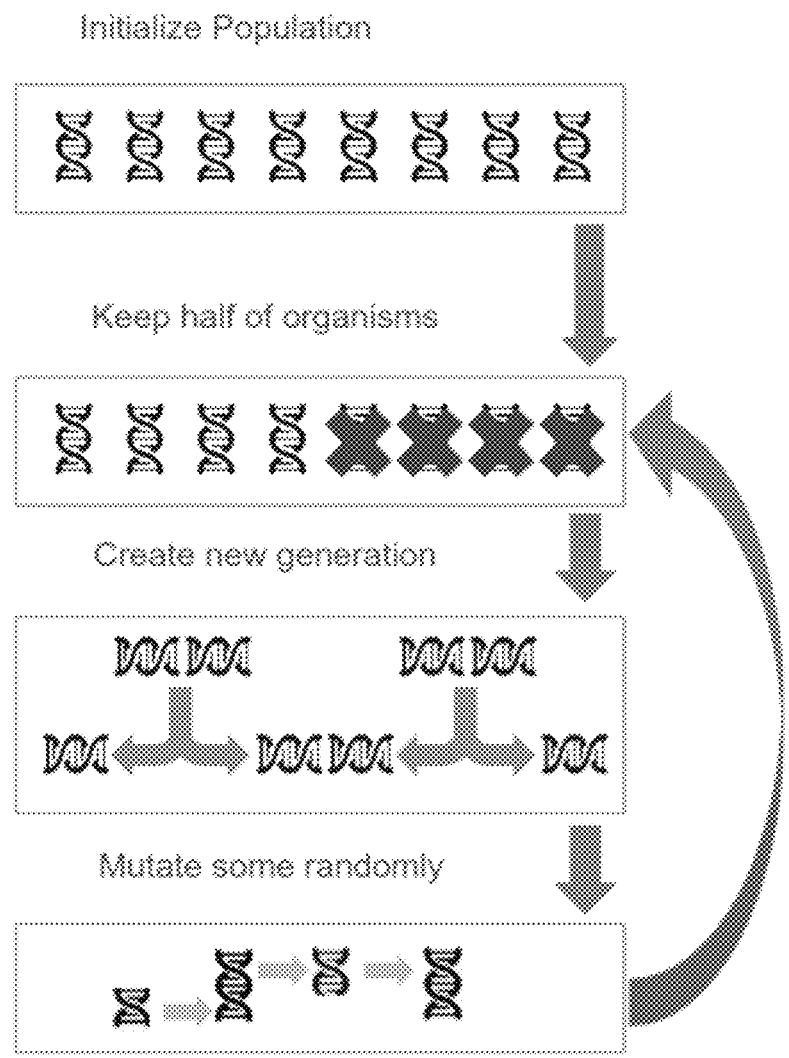
FIG. 1 is a schematic illustration of a non-limiting example embodiment of a genetic computation technique.

At block 1104, the evolutionary calculation engine 310 processes the population subset using an evolutionary computation technique. Any suitable evolutionary computation technique may be used, including but not limited to the evolutionary computation technique illustrated in FIG. 1 and described above.

At block 1106, the evolutionary calculation engine 310 determines a set of candidate solutions based on the processed population subset. In some embodiments, the evolutionary calculation engine 310 may determine the set of candidate solutions by determining one or more candidate solutions having the highest fitness values. In some embodiments, the size of the set of candidate solutions may be determined based on an overall size of the processed population subset. For example, the set of candidate solutions may include the top one percent of the processed population subset.

At block 1108, the evolutionary calculation engine 310 transmits the set of candidate solutions to the archipelago manager computing device 304, and at block 1110, the evolutionary calculation engine 310 receives a set of new candidate solutions from the archipelago manager computing device 304. In some embodiments, the set of new candidate solutions may include the same number of candidate solutions as the transmitted set of candidate solutions in order to ensure that the processed set of candidate solutions remains a consistent size. In some embodiments, the time at which the set of candidate solutions is transmitted to the archipelago manager computing device 304 may include a randomization component to help reduce synchronization issues.

At decision block 1112, a determination is made regarding whether the island computing device 302 is done processing population subsets. In some embodiments, the determination may be made based on whether a predetermined number of generations or iterations have been completed. In some embodiments, the determination may be made based on whether the fitness values of the population subset has stabilized or reached a fitness threshold. If the island computing device 302 is not done processing population subsets, then the result of decision block 1112 is NO, and the method 1100 returns to block 1104 to continue processing population subsets. Otherwise, if the island computing device 302 is done processing population subsets, then the result of decision block 1112 is YES, and the method 1100 proceeds to block 1114. At block 1114, the evolutionary calculation engine 310 transmits a set of final candidate solutions to the archipelago manager computing device 304. The method 1100 then proceeds to an end block and terminates.

Figure 12:
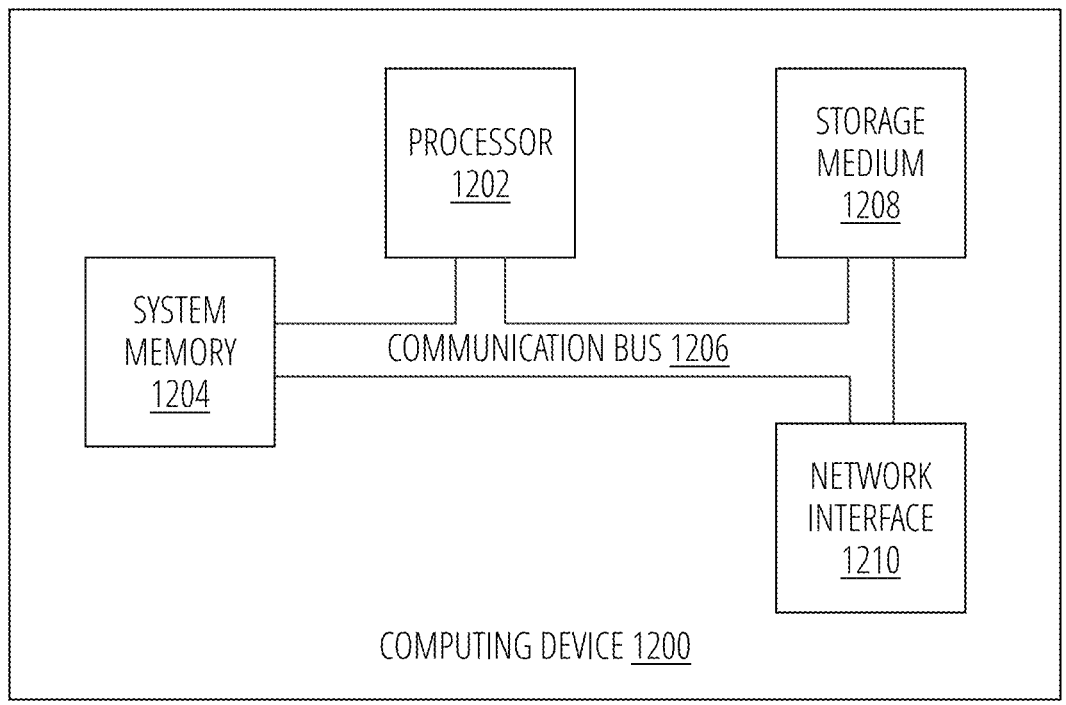
FIG. 12 is a block diagram that illustrates a non-limiting example embodiment of a computing device appropriate for use as a computing device with embodiments of the present disclosure.

FIG. 12 is a block diagram that illustrates aspects of an exemplary computing device 1200 appropriate for use as a computing device of the present disclosure. While multiple different types of computing devices were discussed above, the exemplary computing device 1200 describes various elements that are common to many different types of computing devices. While FIG. 12 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 1200 may be any one of any number of currently available or yet to be developed devices.

In its most basic configuration, the computing device 1200 includes at least one processor 1202 and a system memory 1204 connected by a communication bus 1206. Depending on the exact configuration and type of device, the system memory 1204 may be volatile or nonvolatile memory, such as read only memory ("ROM"), random access memory ("RAM"), EEPROM, flash memory, or similar memory technology. Those of ordinary skill in the art and others will recognize that system memory 1204 typically stores data and/or program modules that are immediately accessible to and/or currently being operated on by the processor 1202. In this regard, the processor 1202 may serve as a computational center of the computing device 1200 by supporting the execution of instructions.

As further illustrated in FIG. 12, the computing device 1200 may include a network interface 1210 comprising one or more components for communicating with other devices over a network. Embodiments of the present disclosure may access basic services that utilize the network interface 1210 to perform communications using common network protocols. The network interface 1210 may also include a wireless network interface configured to communicate via one or more wireless communication protocols, such as WiFi, 2G, 3G, LTE, WiMAX, Bluetooth, Bluetooth low energy, and/or the like. As will be appreciated by one of ordinary skill in the art, the network interface 1210 illustrated in FIG. 12 may represent one or more wireless interfaces or physical communication interfaces described and illustrated above with respect to particular components of the computing device 1200.

In the exemplary embodiment depicted in FIG. 12, the computing device 1200 also includes a storage medium 1208. However, services may be accessed using a computing device that does not include means for persisting data to a local storage medium. Therefore, the storage medium 1208 depicted in FIG. 12 is represented with a dashed line to indicate that the storage medium 1208 is optional. In any event, the storage medium 1208 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

Suitable implementations of computing devices that include a processor 1202, system memory 1204, communication bus 1206, storage medium 1208, and network interface 1210 are known and commercially available. For ease of illustration and because it is not important for an understanding of the claimed subject matter, FIG. 12 does not show some of the typical components of many computing devices. In this regard, the computing device 1200 may include input devices, such as a keyboard, keypad, mouse, microphone, touch input device, touch screen, tablet, and/or the like. Such input devices may be coupled to the computing device 1200 by wired or wireless connections including RF, infrared, serial, parallel, Bluetooth, Bluetooth low energy, USB, or other suitable connections protocols using wireless or physical connections. Similarly, the computing device 1200 may also include output devices such as a display, speakers, printer, etc. Since these devices are well known in the art, they are not illustrated or described further herein.

Though a single archipelago is described above, in some embodiments, a nested archipelago architecture may be used. For example, a complicated problem may be broken up into sub-problems, and each sub-problem may be assigned to a separate child archipelago manager computing device 304. Once each child archipelago manager computing device 304 has determined one or more solutions to its assigned sub-problem, the solutions may be transmitted to a parent archipelago manager computing device 304, which then combines the solutions to the sub-problems to create an overall solution to the complicated original problem. One example of a problem that could be addressed in this manner is the automated design of a filter circuit that filters multiple bands. The design of a filter circuit for each band may be determined by a separate child archipelago, and a parent archipelago may combine the designs generated by the child archipelagos into a single combined multi-band filter circuit.

While illustrative embodiments have been illustrated and described, it will be appreciated that various changes can be made therein without departing from the spirit and scope of the disclosure. The order in which some or all of the process blocks appear in each process should not be deemed limiting. Rather, one of ordinary skill in the art having the benefit of the present disclosure will understand that some of the process blocks may be executed in a variety of orders not illustrated, or even in parallel.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:
1. A system, comprising:
a plurality of island computing devices each configured to perform an evolutionary computation technique to generate candidate solutions, wherein performing the evolutionary computation technique to generate candidate solutions includes:
  determining a fitness value for a plurality of individuals in a population;
  removing a number of individuals from the population based on the fitness values;
  generating new individuals by combining traits from individuals of the population; and
  randomly changing traits in one or more individuals in the population;
wherein the plurality of island computing devices includes a first island computing device; and
wherein the system further comprises an archipelago manager computing device including at least one processor and a non-transitory computer-readable medium having logic stored thereon that, in response to execution by the at least one processor, causes the archipelago manager computing device to perform actions comprising:
  receiving a first set of candidate solutions from the first island computing device;
  storing the first set of candidate solutions in an archipelago management queue;
  removing a second set of candidate solutions from the archipelago management queue;
  transmitting the second set of candidate solutions to the first island computing device;
  receiving a third set of candidate solutions from the first island computing device;
  removing a fourth set of candidate solutions from the archipelago management queue; and
  transmitting the fourth set of candidate solutions to the first island computing device;
wherein the second set of candidate solutions and the fourth set of candidate solutions include at least two candidate solutions that were not generated by the same island computing device.

2. The system of claim 1, wherein the actions further comprise:
  generating an initial population of individuals;
  dividing the initial population into a plurality of population subsets; and
  transmitting each population subset of the plurality of population subsets to a separate island computing device of the plurality of island computing devices.

3. The system of claim 2, wherein dividing the initial population into the plurality of population subsets includes:
  determining capabilities of each island computing device of the plurality of island computing devices; and
  sizing each population subset of the plurality of population subsets based on capabilities of a corresponding island computing device.

4. The system of claim 3, wherein the plurality of island computing devices further includes a second island computing device, wherein the second island computing device has at least one of a different memory capacity and a different processing power than the first island computing device.

5. The system of claim 2, wherein the actions further comprise:
  receiving top candidate solutions from each island computing device of the plurality of island computing devices;
  determining one or more island computing devices to reset based on the top candidate solutions;
  generating a new population of individuals;
  dividing the new population of individuals into a plurality of new population subsets; and
  transmitting each new population subset of the plurality of new population subsets to a separate island computing device of the one or more island computing devices to reset.

6. The system of claim 5, wherein generating the new population of individuals includes determining the new population of individuals to avoid overlap with the population subsets previously processed by the one or more island computing devices to reset.

7. The system of claim 1, wherein removing the second set of candidate solutions from the archipelago management queue includes:
  determining a number of candidate solutions within the first set of candidate solutions; and
  removing a matching number of candidate solutions from the archipelago management queue for inclusion in the second set of candidate solutions.

8. The system of claim 1, wherein the actions further comprise:
  receiving a fifth set of candidate solutions from a third island computing device of the plurality of island computing devices;
  storing the fifth set of candidate solutions in the archipelago management queue;
  removing a sixth set of candidate solutions from the archipelago management queue; and
  transmitting the sixth set of candidate solutions to the third island computing device;
  wherein the fifth set of candidate solutions includes a different number of candidate solutions than the first set of candidate solutions.

9. The system of claim 1, further comprising a requesting computing device, wherein the actions further comprise:
  in response to detecting an end condition, transmitting one or more top candidate solutions to the requesting computing device.

10. The system of claim 1, wherein the candidate solutions generated by the evolutionary computation technique are circuit designs.

11. A system, comprising:
  a plurality of island computing devices each configured to perform an evolutionary computation technique to generate candidate solutions,
  wherein performing the evolutionary computation technique to generate candidate solutions includes:
    determining a fitness value for a plurality of individuals in a population;
    removing a number of individuals from the population based on the fitness values;
    generating new individuals by combining traits from individuals of the population; and
    randomly changing traits in one or more individuals in the population;
  wherein the plurality of island computing devices includes a first island computing device; and
  wherein the system further comprises an archipelago manager computing device including at least one processor and a non-transitory computer-readable medium having logic stored thereon that, in response to execution by the at least one processor, causes the archipelago manager computing device to perform actions comprising:
    generating an initial population of individuals;
    dividing the initial population into a plurality of population subsets;

transmitting each population subset of the plurality of population subsets to a separate island computing device of the plurality of island computing devices;

receiving top candidate solutions from each island computing device of the plurality of island computing devices;

determining one or more island computing devices to reset based on the top candidate solutions;

generating a new population of individuals;

dividing the new population of individuals into a plurality of new population subsets; and transmitting each new population subset of the plurality of new population subsets to a separate island computing device of the one or more island computing devices to reset.

12. A system, comprising:

a plurality of island computing devices each configured to perform an evolutionary computation technique to generate candidate solutions, wherein performing the evolutionary computation technique to generate candidate solutions includes:

determining a fitness value for a plurality of individuals in a population;

removing a number of individuals from the population based on the fitness values;

generating new individuals by combining traits from individuals of the population; and randomly changing traits in one or more individuals in the population;

wherein the plurality of island computing devices includes a first island computing device; and wherein the system further comprises an archipelago manager computing device including at least one processor and a non-transitory computer-readable medium having logic stored thereon that, in response to execution by the at least one processor, causes the archipelago manager computing device to perform actions comprising:

receiving a first set of candidate solutions from the first island computing device;

storing the first set of candidate solutions in an archipelago management queue;

removing a second set of candidate solutions from the archipelago management queue; and transmitting the second set of candidate solutions to the first island computing device;

wherein the second set of candidate solutions includes a different number of candidate solutions than the first set of candidate solutions.

* * * * *